United States Patent
Yegin

(10) Patent No.: US 7,657,929 B2
(45) Date of Patent: Feb. 2, 2010

(54) METHOD AND SYSTEM FOR CLIENT AUTHENTICATION

(75) Inventor: Alper Yegin, Istanbul (TR)

(73) Assignee: Samsung Electronics Co., Ltd., Suwon-Si (KR)

( * ) Notice: Subject to any disclaimer, the term of this patent is extended or adjusted under 35 U.S.C. 154(b) by 828 days.

(21) Appl. No.: 11/115,333

(22) Filed: Apr. 27, 2005

(65) Prior Publication Data

US 2005/0246779 A1 Nov. 3, 2005

Related U.S. Application Data

(60) Provisional application No. 60/566,069, filed on Apr. 29, 2004.

(30) Foreign Application Priority Data

Apr. 26, 2005 (KR) .................. 10-2005-0034439

(51) Int. Cl.
*H04L 29/06* (2006.01)

(52) U.S. Cl. ................. 726/3; 713/168; 380/247; 380/270

(58) Field of Classification Search ................. None
See application file for complete search history.

(56) References Cited

U.S. PATENT DOCUMENTS 7,395,050 B2 * 7/2008 Tuomi et al. ............ 455/411
7,398,550 B2 * 7/2008 Zick et al. .................. 726/5

OTHER PUBLICATIONS

Kaufman et al., "Network Security—Private Communication in a Public World", 1995, Prentice Hall, p. 224.*
Stallings, "Cryptography and Network Security—Principles and Practices", 1999, Prentice Hall, 2nd Edition, pp. 444-457.*
Ghosh, "Mobile IP", ACM, Apr. 2004, Retrieved from the Internet on Sep. 1, 2009: <URL: http://web.archive.org/web/20040407104705/http://www.acm.org/crossroads/xrds7-2/mobileip.html>.*

* cited by examiner

*Primary Examiner*—Minh Dinh
(74) *Attorney, Agent, or Firm*—Staas & Halsey LLP

(57) ABSTRACT

A method by authorizing the access of a client by performing an anonymous Diffie-Hellman exchange that can produce authentication material (secret key) between the client and the server, and binding the key to the service-oriented state information asserted by the client. The secret key can be used in the future to prove the ownership of resources as outlined in the state information. This method enables resource ownership-dependent service authorization without requiring initial identity authentication.

10 Claims, 3 Drawing Sheets

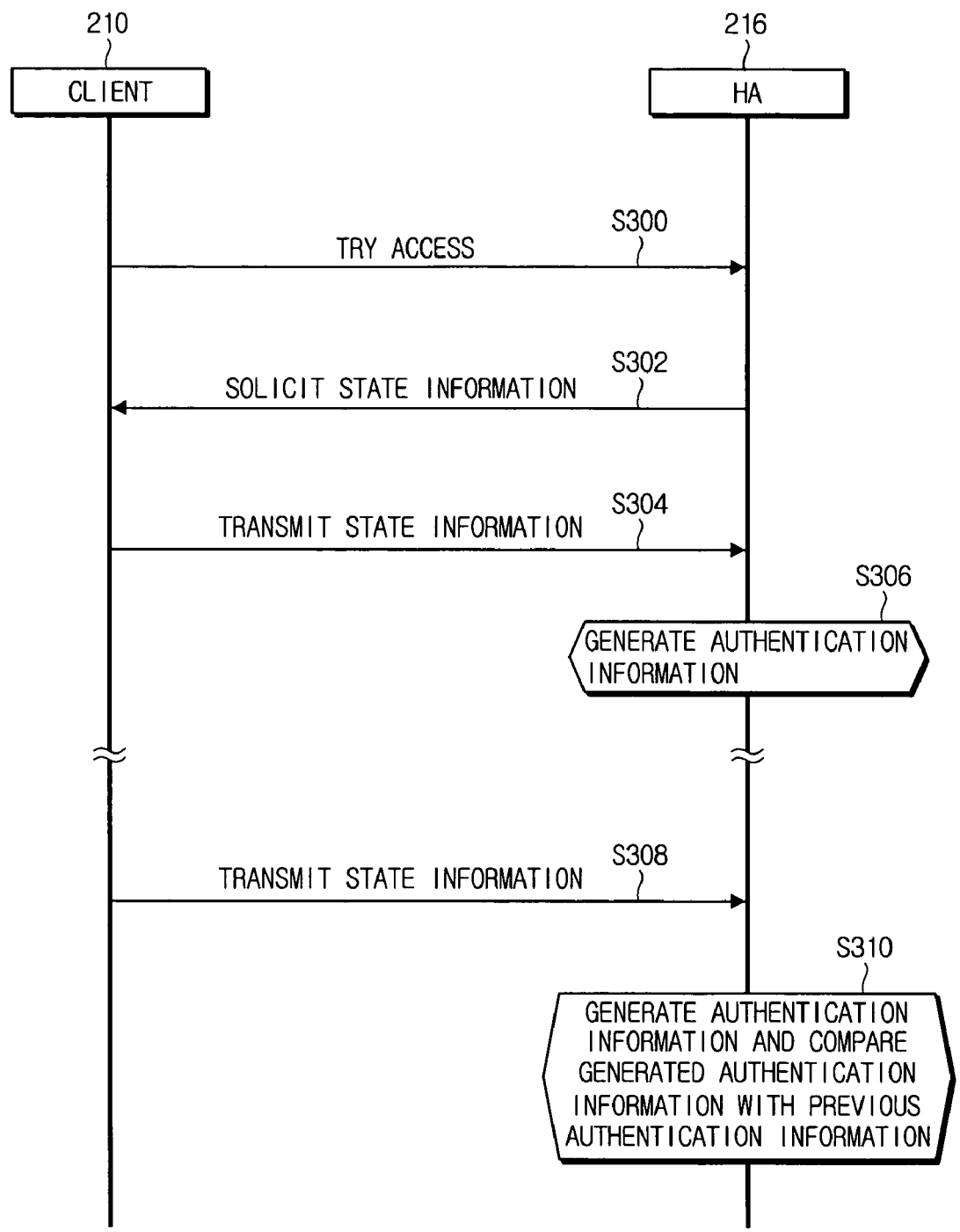

METHOD AND SYSTEM FOR CLIENT AUTHENTICATION

CROSS-REFERENCE TO RELATED APPLICATIONS

This application claims the benefit from U.S. Provisional Application No. 60/566,069, filed on Apr. 29, 2004 in the United States Patent and Trademark Office, the disclosure of which is incorporated herein by reference.

BACKGROUND OF THE INVENTION

1. Field of the Invention

The present invention relates generally to an extensible authentication protocol (EAP). More particularly, the present invention relates to a method of performing an authentication between an authentication server and a client.

2. Description of the Related Art

The present invention suggests a communication system that does not require user authentication as in a wireless local area network (WLAN). The WLAN and problems occurring in the communication system requiring no user authentication are explained to facilitate the understanding of the present invention. The WLAN is called Wi-Fi in that it is conveniently used like a hi-fi audio. Personal digital assistants (PDAs) or notebook computers positioned within a predetermined distance from a point at which access points (APs) are installed can use ultrahigh speed Internet. Unlike a wired LAN, the WLAN uses a radio frequency and thus does not need telephone lines or private lines. However, the PDAs or the notebook computers must contain wireless LAN cards.

A transmission rate of the WLAN is 4 Mbps to 11 Mbps and thus can receive and transmit mass multimedia information. In addition, the usage rate of the WLAN is inexpensive compared to its usage time, and the WLAN is outstanding in terms of mobility and security. Therefore, the WLAN is very useful for temporally installing a network in department stores, hospitals, museums, exhibitions, seminars, construction sites, or the like.

FIG. 1 shows an AP and a plurality of clients (nodes) constituting a conventional WLAN. Operations performed by devices constituting the conventional WLAN will now be described with reference to FIG. 1.

An AP 100 is linked to a plurality of clients 110, 112, 114, and 116. The AP 100 transmits data received from the plurality of clients 110, 112, 114, and 116 to an external server or receives data solicited by the plurality of clients 110, 112, 114, and 116 from the external server. The AP 100 transmits the data received from the external server to the plurality of clients 110, 112, 114, and 116.

The plurality of clients 110, 112, 114, and 116 transmit data to or receive data from the external server using the AP 100.

It is supposed that the clients 110, 112, 114, and 116 try to access the AP 100. In general, the AP 100 may access the plurality of clients 110, 112, 114, and 116 only within a set radio resource. Thus, in a case where a solicitation for a radio resource exceeding the set radio resource is made, the AP 100 allows some of the plurality of clients 110, 112, 114, and 116 making a solicitation for an access to access the AP 100 according to a predetermined protocol.

In general, the AP 100 gives priority to a client that has first tried to access to the AP 100 and allows the client to access according to the priority.

The client provides the AP with its state information requested from the AP to the AP. (For example, the state information can be the IP address of the client.) Meanwhile, a third client can collect state information of a current client, the third client is able to access the AP instead of the current client. (Following the same example, the third client can attempt to steal the IP address assigned to the victim client. This would be a service theft.)

In this regard, various solutions have been suggested to prevent the third client from accessing the AP using the state information of the current client.

In general, the WLAN performs an authentication process to a client using an extensible authentication protocol (EAP). For this purpose, the WLAN includes an authentication server in addition to a client and an AP.

According to the conventional EAP, the authentication server authenticates a client using a user password. Also, the client must be authenticated prior to an access to a network.

SUMMARY OF THE INVENTION

Accordingly, the present general inventive concept has been made to solve the above-mentioned and/or problems, and an aspect of the present general inventive concept is to provide an extensible authentication protocol (EAP) by which an authentication server can authenticate a client without using a user password.

According to an aspect of the present invention, there is provided a method of authenticating a client, including: soliciting state information of the client soliciting an access; and generating authentication information using the received state information according to a Diffie-Hellman algorithm. Note that Diffie-Hellman is algorithm is used for anonymous authentication. It is not used for verification of authenticated identities.

According to another aspect of the present invention, there is provided an authentication system including: a client transmitting state information; and an authentication information generator soliciting the client trying to an access to transmit the state information and generating authentication information from the received state information according to a Diffie-Hellman algorithm.

BRIEF DESCRIPTION OF THE DRAWINGS

The above aspects and features of the present invention will be more apparent by describing certain embodiments of the present invention with reference to the accompanying drawings, in which:

FIG. 3 illustrates a process of authenticating a client using a HA according to an embodiment of the present invention.

DETAILED DESCRIPTION OF THE PREFERRED EMBODIMENTS

Figure 1:
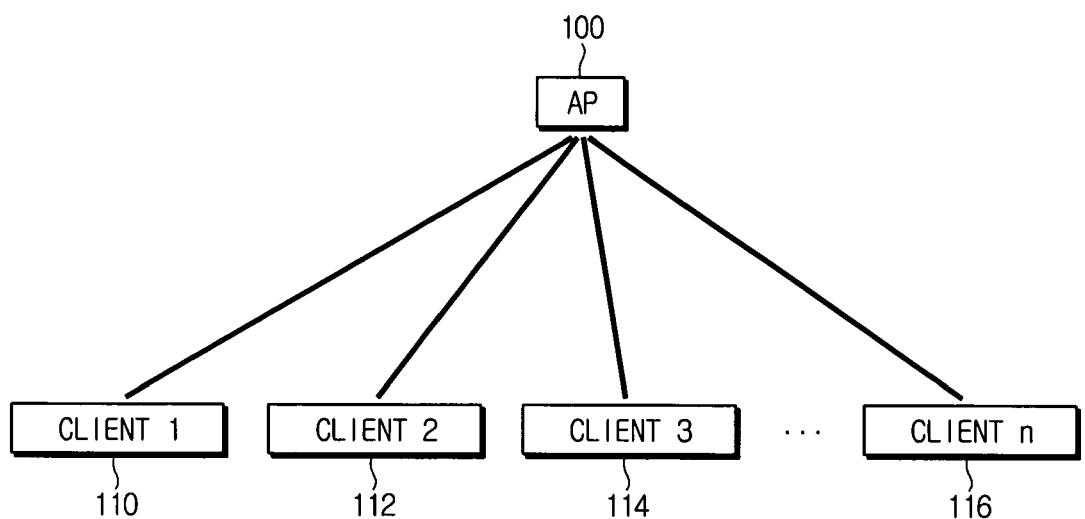
FIG. 1 illustrates an AP and a plurality of clients constituting a conventional WLAN.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The present invention suggests a method for a home agent to generate an encryption key by use of state information of a client and to authenticate the client using the generated encryption key.

Figure 2:
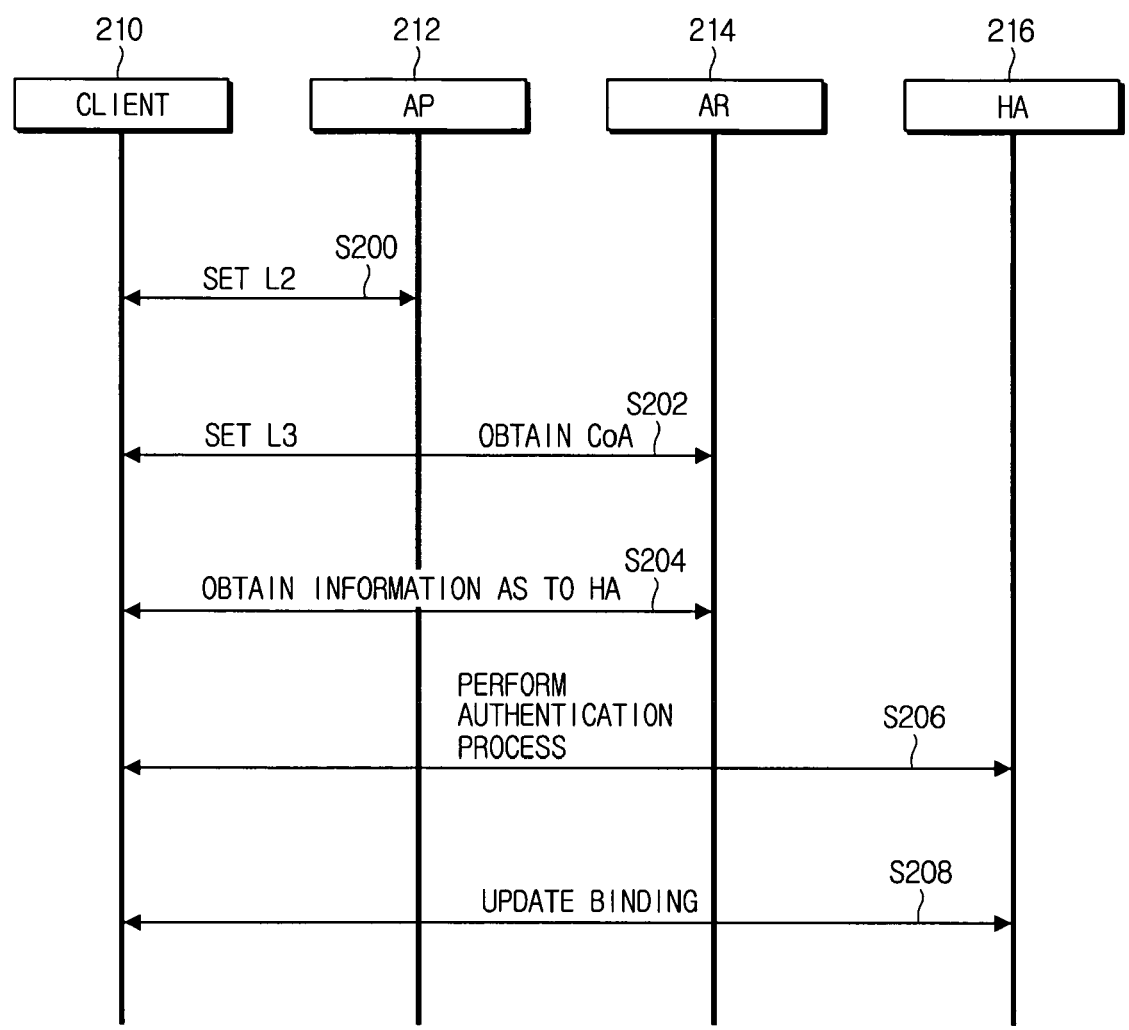
FIG. 2 illustrates a client authentication system including a client, an AP, an access router (AR), and a home agent (HA) according to an embodiment of the present invention.

FIG. 2 depicts a client authentication system including a client 210, an access point (AP) 212, an access router (AR) 214, and a home agent (HA) 216 according to an embodiment of the present invention. Operations performed by the client authentication system and the devices constituting the client authentication system will now be described with reference to FIG. 2.

In operation S200, the client 210 trying to access a network sets a layer 2 with the AP 212. If the client 210 accesses the AP 212 to try to access the network, the AP 212 sets the layer 2 with the client 210. In other words, the AP 212 transmits and receives an MAC frames to and from the client 210.

In operation S202, the client 210 which has set the MAC address sets up a layer 3 connection with the AR 214. In specific, the client 210 and the AR 214 establish the layer 3 by transceiving information required for the establishment of the layer 3. Also, if the client 210 links to the AR 214, the client 210 is assigned a care of address (CoA) that is a temporal address from the AR 214. The CoA is an address through which the client 210 can be reached while roaming to external networks.

In operation S204, the client 210 obtains information as to the HA 216 from the AR 214. Note that the client 210 obtains information relating to a relevant agent from the AR 214 in case of other systems, excluding the WLAN, that do not require the user authentication.

In operation S206, the HA 216 performs an authentication process to the client 210. In specific, the HA 216 performs the authentication process to the client 210 which has solicited an access, using state information of the client 210. In this particular implementation of the invention, the state information includes the mapping between the home address and CoA of the client 210.

In operation S208, the HA 216 performs a binding process to the client 210. If the layer 3 is changed, the HA 216 registers the changed CoA in the external network following the same procedure.

As described above, the HA 216 performs the authentication process to the client 210 using the anonymous Diffie-Hellman and bind that authentication to the state information of the client 210. The state information includes a home and care-of addresses assigned to the client 210.

FIG. 3 is a view illustrating a process of authenticating the client 210 using the HA 216 according to an embodiment of the present invention. The process of authenticating the client 210 using the HA 216 will now be described with reference to FIG. 3.

In operation S300, the client 210 tries to access the HA 216. The client 210 tries to access the home network to transmit data to or receive data from the external network.

In operation S302, the HA 216 solicits the client 210, which has solicited an access thereto, to transmit the state information. As described above, the state information may include an address assigned to the client 210 for the access to the home network.

In operation S304, the client 210 transmits its state information thereof to the HA 216.

In operation S306, the HA 216 generates an encryption key using the received state information and stores the generated encryption key in a memory. According to an embodiment of the present invention, the HA 216 generates the encryption key from the received state information according to Diffie-Hellman algorithm. The HA 216 stores the received state information and the encryption key generated from the state information at the same time. Table I shows an example of information stored in the memory of the HA 216.

TABLE 1

| Device | State information | Encryption key |
|---|---|---|
| Device 1 | a | A |
| Device 2 | b | B |
| . | . | . |
| . | . | . |
| . | . | . |
| Device n | c | C |

In Table 1, the HA 216 generates the encryption key A from the received state information a according to the Diffie-Hellman algorithm, generates the encryption key B from the received state information b, and generates the encryption key C from the received state information c. In the prior art, the authentication information is generated using a user password. However, in the present invention, the authentication information (encryption key) is generated using the anonymous Diffie-Hellman exchange with the client 210. Therefore, since a user password is not required to be input, a user does not need to manipulate an additional key for authentication. In short, transmission and reception of the state information according to an embodiment of the present invention are performed without manipulating the additional key by the user.

The HA 216 performs such an authentication process to generate the authentication information for the client 210.

In operation S308, the client 210 transmits the state information to the HA 216 to access the home network.

In operation S310, the HA 216 generates the authentication information using the state information received in operation S308 and determines whether the generated authentication information is equal to one of authentication information that are generated and stored prior to the generated authentication information.

If the HA 216 determines in operation S310 that the generated authentication information is equal to one of the stored authentication information, the HA 216 allows the access of the client 210 to the home network. If the HA 216 determines in operation S310 that the generated authentication information is not equal to one of the stored authentication information, the HA 216 does not allow the access of the client 210 to the external network.

Alternatively, the HA 216 may provide the generated authentication information to the client 210 after operation S306. The client 210, like the HA 216, stores its state information and the authentication information generated from the state information. The client 210, which intends to access the HA 216, transmits a message containing its state information and the authentication information to the HA 216 in operation S308.

Upon receiving the message containing the state information and the authentication information, the HA 216 determines whether the received state information is stored in the memory. If the state information is not stored in the memory according to the determination, the HA 216 does not allow the access of the client 210 that solicits the access. Conversely, if the state information is stored in the memory, the HA 216 determines whether the received authentication information equals the stored authentication information, and allows the access of the client 210 that solicits the access when the two information equal to each other. Note that the HA 216 allows the access only when the authentication information equal with respect to the same state information.

Accordingly, an authentication is performed with respect to the client 210 soliciting an access without manipulating an additional user key.

As described above, in a method and a system for client authentication according to an embodiment of the present invention, a HA can authenticate a client using state information without a user password.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of authenticating a client, comprising:
   soliciting, by an authentication information generator, state information of the client soliciting an access;
   receiving, by the authentication information generator, the state information from the client;
   generating, by the authentication information generator, authentication information using the received state information along with an anonymous Diffie-Hellman algorithm; and
   authenticating, by the authentication information generator, the client using the generated authentication information,
   wherein the state information includes a care of address (CoA) and a home address, and
   wherein the client receives the CoA and information as to the authentication information generator from an access router (AR).

2. The method of claim 1, wherein the CoA and the home address are assigned to the client.

3. The method of claim 1, wherein the authenticating step further comprises:
   storing the generated authentication information;
   generating authentication information using newly transmitted state information;
   determining whether authentication information equal to the generated authentication information is stored; and
   allowing the access of the client having authentication information equal to the stored authentication information.

4. The method of claim 1, wherein the access is solicited using information as to the authentication information generator transmitted from the access router.

5. The method of claim 1, wherein the client links to the access router using an access point linked to the client.

6. An authentication system comprising:
   a client receiving a care of address (CoA) and other information, and transmitting state information; and
   an authentication information generator soliciting the client trying to access the authentication information generator, receiving the state information from the client, generating authentication information from the received state information according to an anonymous Diffie-Hellman algorithm, and authenticating the client using the generated authentication information,
   wherein the state information includes the CoA and a home address,
   wherein the client receives the CoA and the other information from an access router (AR), the other information being information as to the authentication information generator.

7. The authentication system of claim 6, wherein the CoA and the home address are assigned to the client.

8. The authentication system of claim 6, wherein the authentication information generator authenticates the client by storing the generated authentication information, generating authentication information using newly transmitted state information, determining whether authentication information equal to the generated authentication information is stored, and allowing the access of the client having the authentication information equal to the generated authentication information.

9. The authentication system of claim 6, further comprising:
   an access point setting a link between the client and the access router.

10. An authentication information generator configured to perform a method of authenticating a client, the method comprising:
    soliciting a care of address (CoA) and a home address of the client soliciting an access;
    receiving the CoA and the home address from the client;
    generating authentication information using the received CoA and home address along with an anonymous Diffie-Hellman algorithm; and
    authenticating the client using the generated authentication information, wherein the client receives the CoA and information as to the authentication information generator from an access router (AR).

* * * * *